United States Patent [19]

Lorteije et al.

[11] Patent Number: 4,672,357
[45] Date of Patent: Jun. 9, 1987

[54] MATRIX CONTROL CIRCUIT FOR A MEMORY DISPLAY

[75] Inventors: Jean H. J. Lorteije; Geert Warrink, both of Eindhoven, Netherlands

[73] Assignee: U.S. Philips Corporation, New York, N.Y.

[21] Appl. No.: 690,334

[22] Filed: Jan. 10, 1985

[30] Foreign Application Priority Data

Jan. 13, 1984 [EP] European Pat. Off. ......... 842000473

[51] Int. Cl.[4] ............................................. G09G 3/00
[52] U.S. Cl. .................................... 340/793; 340/799
[58] Field of Search ............... 340/784, 789, 792, 793, 340/798, 799, 800, 804

[56] References Cited

U.S. PATENT DOCUMENTS

| | | | |
|---|---|---|---|
| 4,180,813 | 12/1979 | Yoneda | 340/800 X |
| 4,193,095 | 3/1980 | Mizushima | 340/793 X |
| 4,236,154 | 11/1980 | Lee | 340/792 X |
| 4,308,534 | 12/1981 | Yamamoto | 340/792 X |
| 4,353,062 | 10/1982 | Lorteije et al. | 340/792 X |
| 4,359,730 | 11/1982 | Kunikane et al. | 340/792 |
| 4,427,978 | 1/1984 | Williams | 340/793 X |
| 4,488,150 | 12/1984 | Kanatani | 340/793 X |

Primary Examiner—Gerald L. Brigance
Assistant Examiner—Vincent P. Kovalick
Attorney, Agent, or Firm—Thomas A. Briody; Jack Oisher; William J. Streeter

[57] ABSTRACT

Control circuit for memory type matrix display with k columns and r rows for k times r display elements, wherein each display element can have one of $2^m$ brightness levels. This control circuit has a video memory for storing brightness information for the display element of each column. It comprises a column memory for each column. Each column memory including m column shift registers. Each column shift register having an input coupled to a corresponding information input for that column, and an output. A line time shift signal $C_s$ being applied to the shift pulse input of all column shift registers for shifting all column shift registers substantially at the end of each line time. The m output bits thus obtained are sequenced by means of a controlled gate circuit to produce a sequence of output bits at the information output of that column. This gate circuit is controlled such that each output bit lasts a predetermined part of the subsequent video line time.

5 Claims, 11 Drawing Figures

MATRIX CONTROL CIRCUIT FOR A MEMORY DISPLAY

The invention relates to a matrix control circuit for a memory-type visual display with k column inputs and r row inputs for k times r display elements, the matrix control circuit having:

an m-bit parallel digital video input defining sequentially one out of $2^m$ brightness levels for each display element of a row y (y=1, 2, ..., r) during successive video line times $T_{y-1}$ within a frametime that is at least equal to r times a video line time;

a series-parallel converter connected to the digital video input, having k times m column outputs, corresponding to m bits for each column;

a video memory for the storage of column brightness information, having k times m information inputs which are coupled to the corresponding outputs of the series-parallel converter and k information outputs connected to the k corresponding column inputs of the display;

a Y-selection circuit having r selection outputs connected to the corresponding r row inputs of the display, the Y-selection circuit providing (m+1) selection pulses to each row of the display for setting or resetting the memory-type display elements of that row;

a timing circuit having at least one clock signal output for supplying a clock signal to clock signal inputs of the video memory and of the Y-selection circuit and a reset signal output for supplying a reset signal to reset signal inputs of the video memory and of the Y-selection circuit.

The invention further relates to an integrated column circuit at least comprising q parts of the video memory corresponding to q out of k columns of the memory-type visual display.

Memory-type displays exist in many forms, using e.g. gas discharge elements, electrochromic elements, liquid crystal elements etc. as the display elements and require X- and Y-driver circuits adapted to the electrical parameters of the chosen display-elements.

Memory-type displays are commonly used for black and white or colour representation of pictures or other data requiring a number of gray-steps together with a sufficiently high contrast, such as television pictures requiring 128 gray-steps or more videotext monitors requiring at least 8 gray-steps.

Matrix control circuits as defined above present logical electrical signals representing zeroes or ones to the display drivers to set or reset the memory-type display elements according to the currently required work-factor (duty cycle) of such elements necessary for a correct representation of the information to be displayed, independent of the specific properties of the memory type display or its correspondingly chosen driver circuits.

For the purpose of this description a memory-type display together with its X- and Y-drivers may be considered as a black box having r digital inputs for the rows and k digital inputs for the columns. The numbers r and k may be large, for a normal resolution colour TV-picture about 600 rows and about 1600 columns will be required.

A matrix control circuit as defined above is described in "Digest of technical papers of the Society for Information Display", First Edition May 1974, pages 28, 29. This publication is to be deemed as incorporated in this description by way of reference. In FIG. 1 of the cited publication a block diagram is presented of a matrix control circuit used to control the display of TV signals converted into digital form on a 512 row, 512 column AC plasma display. The digitized line information is stored in a line storage consisting of m=6 shift registers each having 512 bits, the line storage serving as a series-parallel converter. The videomemory consists mainly of a large Random Access Memory and the "address catenation". Due to the fact, that information bits that have been written into this RAM simultaneously must be read at different times, a dual addressing system is required which results in an addressing control by a special purpose computer having a master clock, a program control, a line counter and a subtractor. This special purpose computer controls also part of the Y-selection. The last part of the Y-selection consists of an address decoding circuit.

As shown in FIG. 2 of the cited publication there are m=6 ignition periods A to F, together nearly filling one full frame period in the example given, which corresponds to a maximum obtainable work-factor of nearly one (or 100%). This requires 512 (=r) storage bits per column in the RAM. If a lower work-factor is acceptable or specified, then the periods A to F can be shortened correspondingly. The number of bits per column in the RAM then also decreases correspondingly.

Furthermore at least one storage element per column is required for the usual input and/or output register of the RAM and m storage elements per column for the m shift registers in the line storage circuit.

SUMMARY OF THE INVENTION

According to the invention a new matrix control circuit is provided offering the same possibilities, but having a video memory of such structure that the control is strongly simplified, requiring only a few timing signals that can be generated at a very low cost. The series-parallel converter and the video memory can be constructed with only one type of basic storage elements and can be easily combined into large scale integrated circuits. The requirements for the Y-selection are simplified correspondingly and the number of required storage elements per column is slightly reduced, which is of importance due to the fact that each small reduction occurs a large number (k) of times.

A matrix control circuit for a memory-type visual display is characterized, according to the invention, in that the video memory comprises a number of k column memories, each having a number of m column shift registers of respectively $b_j$ bits (j=1, 2, ... m), each column shift register having an input that is coupled to the corresponding information input for the corresponding column, a column shift register output and a line time shift signal input for a line time shift signal shifting all column shift registers substantially at the end of each video line time $T_{y-1}$, each column memory further having sequencing means that couple the information shifted into output bits of the column shift registers at the end of a video line time $T_{y-1}$, to the information output of the corresponding column, for each output bit during a different part $C_i$ of the video line time $T_y$, i being one of the numbers 1 through s inclusive with s being a number that is at least equal to m.

Several useful realisations are characterized in the respective claims and will be discussed in detail hereunder and will be explained using the accompanying Figures.

DESCRIPTION OF THE PREFERRED EMBODIMENT

In these Figures and their description corresponding elements are always indicated by the same reference numbers. In so far as such reference numbers are used in the claims for clarity, they shall not be constructed as having a limitative meaning.

Throughout the description the use of JK-flip-flops such as signetics 54107 is assumed.

Such flip-flops act on a negative slope of a timing signal at their clock input, depending on the J-K values prior to this negative slope or on a reset. In some cases a parallel load input is assumed similar to that of the signetics 5496 shift register. The actual implementation of counters and shift registers is not part of the invention. Many variations in this and other technologies can be used to the development of suitable (integrated) circuits and belong to the normal arsenal of persons skilled in the art.

Figure 1:
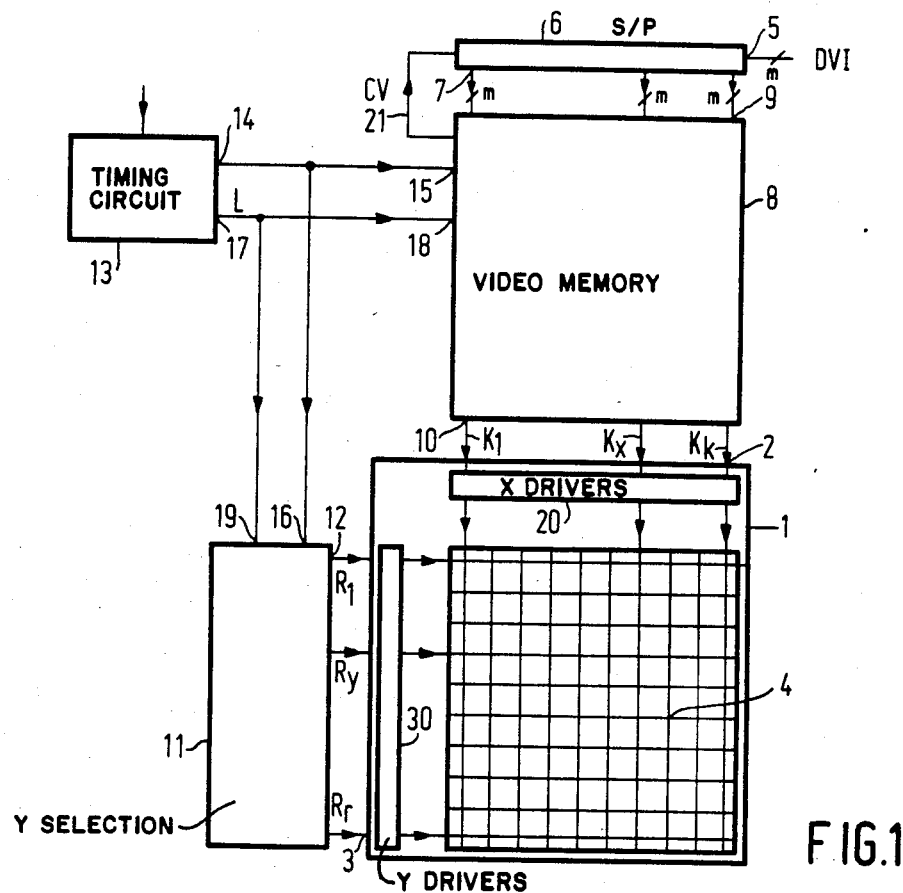
FIG. 1 shows a simplified block diagram of a matrix control circuit according to the state of the art.

In FIG. 1 a memory-type visual display 1 for k columns and r rows is symbolically indicated. It includes k X-drivers 20 for the excitation of column conductors with k corresponding inputs 2 ($K_1-K_k$), r y-drivers 30 for the excitation of row conductors with r corresponding inputs 3 ($R_1-R_r$) and k.r display elements 4.

A digitized video signal is fed to a digital video input 5 of a series-parallel converter 6. The digitized video signal may be obtained by analog to digital conversion of a conventional television signal or from a data processing circuit like a teletext converter or a computer, either by a direct connection or via a suitable bus structure.

For the purpose of this description it is assumed that a brightness value is given as an m-bit logical signal, the m bits being presented simultaneously. Each group of m-bits contains said value for one display element 4 and the m-bit groups are presented serially for each row and row by row. In this example the series-parallel converter 6 may consist of m shift-registers of which m inputs are connected to m inputs 5 for the digital video signal. Any other organisation of the input signals is possible and immaterial to the invention. The information pertaining to one row to be displayed is collected during one video line time and presented on k.m outputs 7 that are coupled to k.m corresponding inputs 9 of a video memory 8 which stores the information to be displayed. As in the matrix control circuit according to the cited publication, the m bits pertaining to a display element 4 are presented sequentially as information output signals on each of k information outputs 10 each coupled to one corresponding column input 2, the least significant bits appearing first, the most significant bits appearing last.

An Y-selection circuit 11 having r selection outputs 12 coupled to the corresponding row inputs 3 of the display 1 supplies digital selection signals always for only one row at a time. Display cells of the selected row are energized when one of the m information bits appears at the information outputs 10 for each display element of that row.

In this description logical "0" and "1" are defined such that display-elements 4 of a row $R_y$ can be set or reset if the corresponding selection output $R_y$ equals "1" and will not change their setting as long as $R_y=$"0". An element of the row $R_y$ will be set in the ON-position or remain ON if the corresponding information output $K_x=$"1" and will be reset to OFF or remain OFF when $K_x=$"0".

A central timing circuit 13 supplies the video memory 8 and the Y-selection 11 with the required timing signals such as a central clock on its output 14 coupled to respective inputs 15, 16 and a load or reset signal on its output 17 coupled to the respective inputs 18, 19. A video clock signal CV on lead 21 for the series-parallel converter, in this case a shift command signal may be supplied by the timing circuit 13 or may be derived from the central clock signal in the video memory 8 as shown in FIG. 1.

The series-parallel converter 6, the video memory 8, the Y-selection 11 and the timing circuit 13 together form a matrix control circuit for the memory-type visual display 1. Other circuitry like a power supply or a manual control panel, although essential for a display apparatus, have been left out to simplify the Figures and because they are not relevant for the invention.

The series-parallel converter 6 and the video memory 8 each comprise k equivalent parts corresponding to the k columns. Those parts of each that are related to one and the same column together constitute one out of k column circuits.

Figure 2:
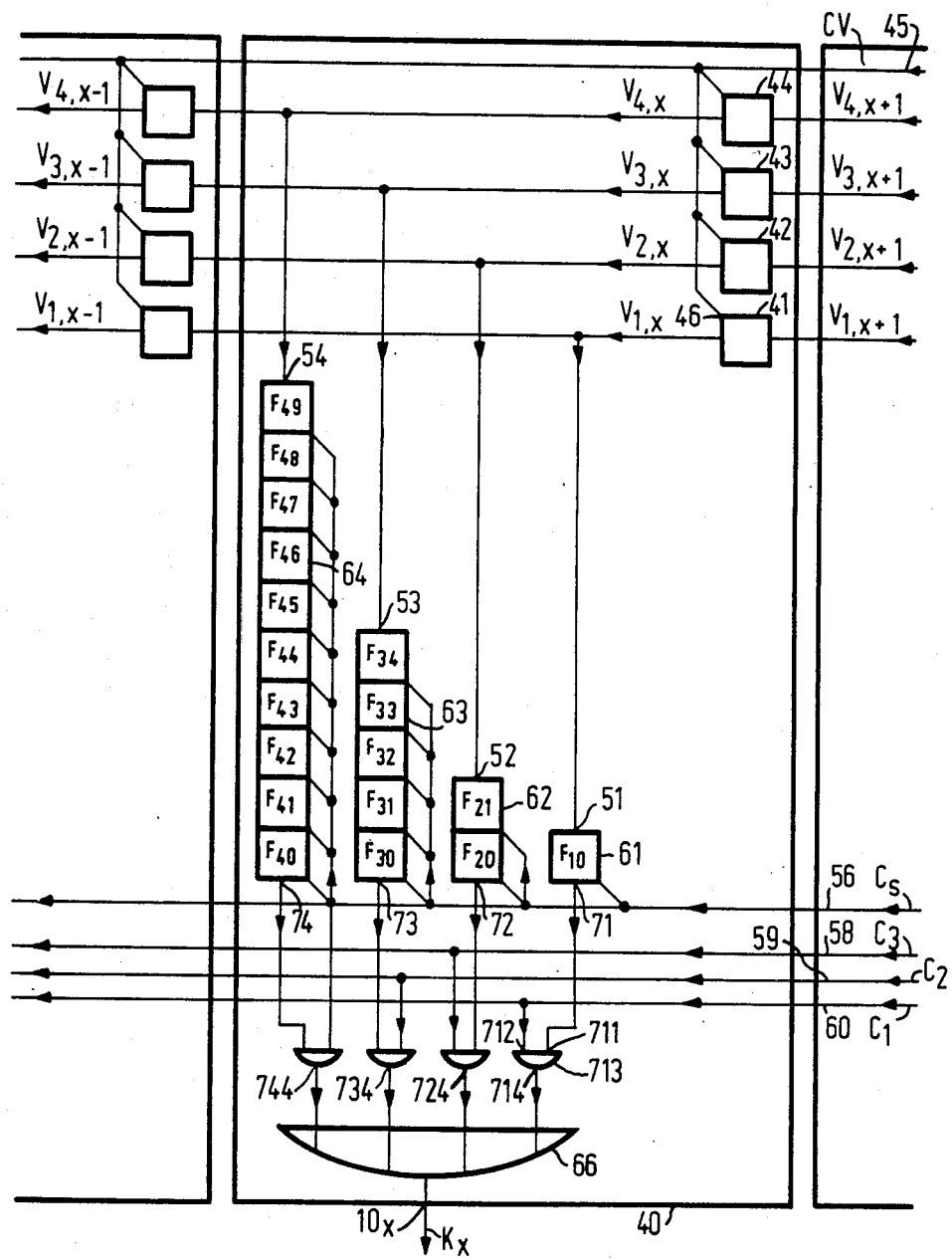
FIG. 2 shows wiring diagram of a part of a video memory according to the invention for one column and a corresponding part of the series-parallel converter.

FIG. 2 shows one such column circuit 40 according to the invention for $m=4$ and $s=5$. The value $m=4$ means that a gray scale having up to $2^m=16$ levels can be defined at the digital video input 5, $s=5$ indicates that each video-line time T is divided into $s=5$ sub-periods of substantially equal length corresponding to five timing signals $C_i$ (i=1, 2, ..., s).

In this example the series-parallel converter 6 consists of $m=4$ shift registers each having k bits. The flip-flops 41–44 in the column circuit 40 each represent one bit of each of these shift-registers. Assuming that the information for the lefthand side of a row is presented first, the bit combinations are shifted from right to left by supplying a shift command signal CV at a shift command signal input 45 common to all shift-registers.

Figure 3:
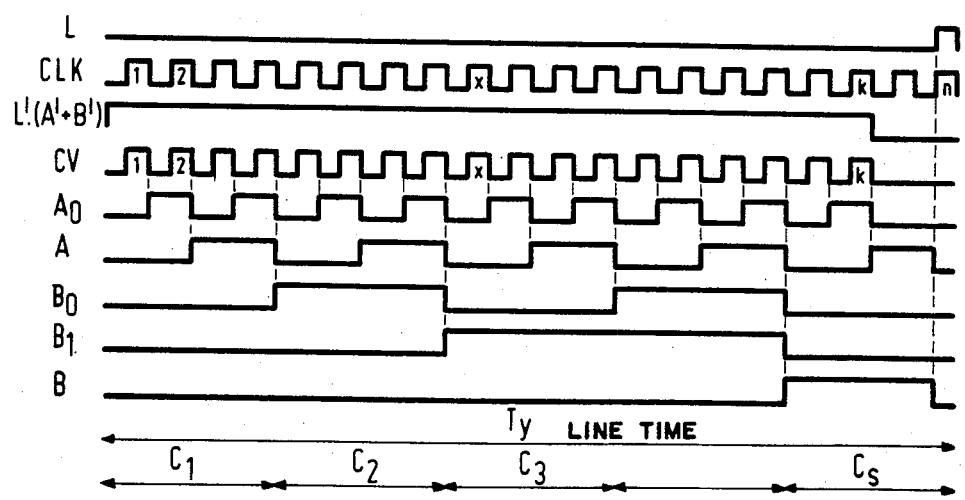
FIG. 3 gives an example of a timing diagram for the control signals required.

After k shift pulses the information for all display elements of one row is placed correctly in the 4 k flip-flops. Video line times will be indicated as $T_y$ (y=1, 2, ..., N−1, N), N video line times add to a frame time. N is at least equal to r. In representing television pictures N>r is required due to the fact that a vertical fly-back time has to be taken into account. The information pertaining to row y is written into the shift registers during the major part of the video-line time $T_{y-1}$. Usually a video line time will correspond with n>k clock pulses of which the first k correspond to the CV-pulses as shown in FIG. 3. After the first k clock periods of $T_{y-1}$ the information in the shift registers will be stable during the next (n-k) clock periods.

The flip-flop contents are represented by m=4 signals $V_{1,x}$–$V_{4,x}$ for column number x.

In this and following Figures shift command signals can be recognized easily, all are shown as entering at a corner of a block representing a shift register flip-flop.

The signals $V_{1,x}$–$V_{4,x}$ are presented to the inputs 51–54 of m=4 column shift registers 61–64 together constituting one column memory. In this example the column shift registers all have different bit lengths 1, 2, 5 and 10 bits respectively. All column shift registers are shifted with a common further shift command signal via a common input 56 and will be shifted substantially at the end of each video line time T. This means that the four information bits are written into the first flip-flops of the shift registers 61–64 and will remain there during the period $T_y$ during which period the video shift registers will be filled with information pertaining to row (y+1).

The least significant information bit is directly available at the output 71 of shift register 61 which output 71 is coupled to a first input 711 of an AND-gate 713. A second input 712 is coupled to a common timing input 60 for the sub-period signal $C_1$. The outputs 72–74 of the other column shift registers are similarly connected, but combined with different timing signals $C_i$ but not necessarily in these natural number order. The m=4 AND-gate outputs 714–744 are connected to corresponding inputs of an OR-gate 66 of which the output constitutes the information output $10_x$ of the video memory 8. The m=4 AND-gates form together with the OR-gate one possible implementation of sequencing means to couple the m bit contents in the correct sequence to the information output $10_x$. This information output $10_x$ presents the least significant bit for display element x,y during period $C_1$ of $T_y$ to the video display 1. As will be shown in further figures row $R_y$ will be selected also during $d_1$ of $T_y$. Therefore if the least significant bit is a "1", the display element x,y will be set to "ON".

Since the column shift registers 61–64 are shifted substantially at the end of each video line time T, the next bit for display-element x,y is presented at output 72 during $T_{y+1}$ and will show on information output $10_x$ during sub-period $C_3$ of $T_{y+1}$ and so on. If the one but least significant bit is "0" the display element x,y will be reset to OFF and will have been in the ON-position during (s+2)=7 sub-periods, otherwise it will remain in the ON-position or be set to ON at $C_3$ of $T_{y+1}$, $R_y$ being selected again during that sub-period.

Lastly the row $R_y$ will be selected during period $C_4$ of $T_{y+20}$. Since there is no AND-gate corresponding to $C_4$ the output $k_x=0$ on information output $10_x$, so that a final reset takes place at this moment.

Counting in numbers of sub-periods in this way five set or reset moments are defined. If the respective lengths of the column shift registers 61–64 are $l_1$–$l_4$ and if $l_5=21$ then these moments are at $(l_j-1)\cdot s+i_j-1$ after the start of $T_y$, in this example after $0\cdot s+1-1=0$ $1\cdot s+3-1=7$ $4\cdot s+2-1=21$ $9\cdot s+5-1=49$ $20\cdot s+4-1=103$ These m+1=5 moments enclose m=4 periods of lengths 7, 14, 28 and 54 respectively, during which periods the display element x,y will be ON if the corresponding information bit is "1" and OFF if "0".

Ideally the last period should have a length of 56 sub-periods in which case a completely linear gray-scale can be realised. The final reset then has to take place during $C_1$ of $T_{y+21}$ which is not possible, because then $K_x$ equals the least significant bit of display-element x, y+21 which may be either "0" or "1". However the departure from linearity is smaller than one step of the gray-scale and of no importance.

In general the length of a period $P_j$ (j=1, 2, 3, 4) is:

$$P_j = (l_{j+1}-1)\cdot s + i_{j+1} - -(l_j-1)\cdot s + i_j - 1 = (l_{j+1}-l_j)\cdot s + i_{j+1} - i_j$$

and the values $l_j$ and $i_j$ are chosen such that $P_j=2P_{j-1}$ is approximated as well as possible to obtain a good linearity.

If all bits are "1" then the element x, y will be ON during the total time $A=\Sigma P_j$. Clearly:

$$A=(l_5-1)\cdot s+i_5-1$$

with
$l_5=21$,
$i_5=3$ and
$s=5$:
A = 103 sub-periods.

If for instance the display 1 has r=27 rows, than a frame time including vertical fly-back time of e.g. 30 T could be used, corresponding to $30\cdot s=150$ sub-periods. The maximum possible duty cycle for all display-elements, can then be in this example:

$$d=(103/150)=0{,}69 \text{ or } A=Nds \text{ } (N=30)$$

The great advantage of this memory arrangement is, that no addressing is required. The information is always written into the same column shift register inputs 51–54 and always read out from the same shift register outputs 71–74. Furthermore no separate IN- or OUT memory registers are required, so that the number of flip-flops required in the video memory 8 is slightly lower than that in a state of the art video memory for the same duty cycle.

FIG. 3 shows a timing diagram from this example wherein k=18, n=20. A periodical load signal L and a clock signal CLK are supplied by the timing circuit. The signal CLK is divided by 2 five times, which corresponds to counting modulo-20 since the load signal L resets all signals to "0" at every 20-th CLK-pulse. A gating circuit provides the first shift command signal $VC=CLK\cdot L'\cdot(A'+B')$ for the video shift registers. Furthermore m=4 sub-period timing signals $C_i$ are shown in the last line, corresponding to s=5 sub-periods of each T, in this example $C_1$, $C_2$, $C_3$ and $C_5$, because $C_4$ is not separately required.

To shift the column memory shift registers at the end of $T_y$ the negative back slope of either L or $C_s$ can be used.

Figure 4:
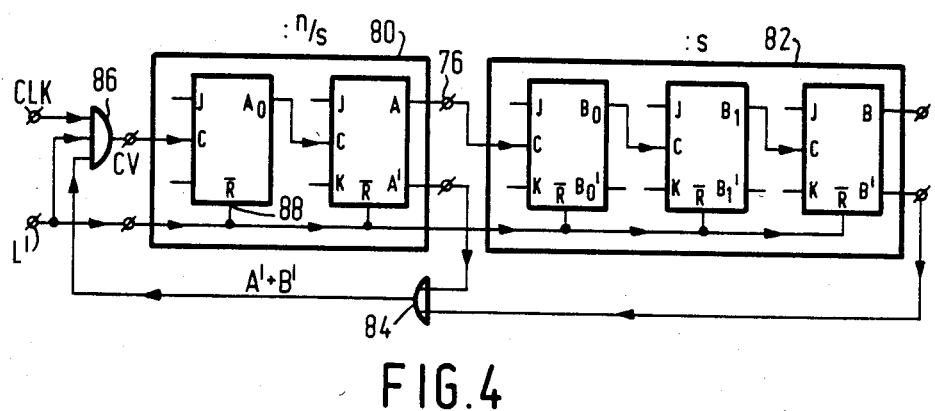
FIG. 4 shows a wiring diagram of a suitable divider for the generation of the required control signals.

A simple circuit to obtain the required signals from CLK and L (or L') is shown in FIG. 4. The circuit consists of two dividers in series, a first divide by n/s counter 80 (n/s=4) and a second divide by s counter 82 (s=5). An OR-gate 84 and an AND-gate 86 from the gating circuit for CV. The counters will receive CV pulses and count thereon as long as either $A'=1$ or $B'=1$ or as long as either $A=0$ or $B_{=0}$. Counting stops when $A=1$ and $B=1$ occurs for the first time, that is in the binary counting position $$10010 = \text{decimal } 18$$

until the counters are reset to zero on their reset inputs 88 ($\bar{R}$) by $L'$.

Any similar counter may be used, the design of counters for other values of n, k and s will be simple for anyone having normal skill in the art of logical design.

Figure 5:
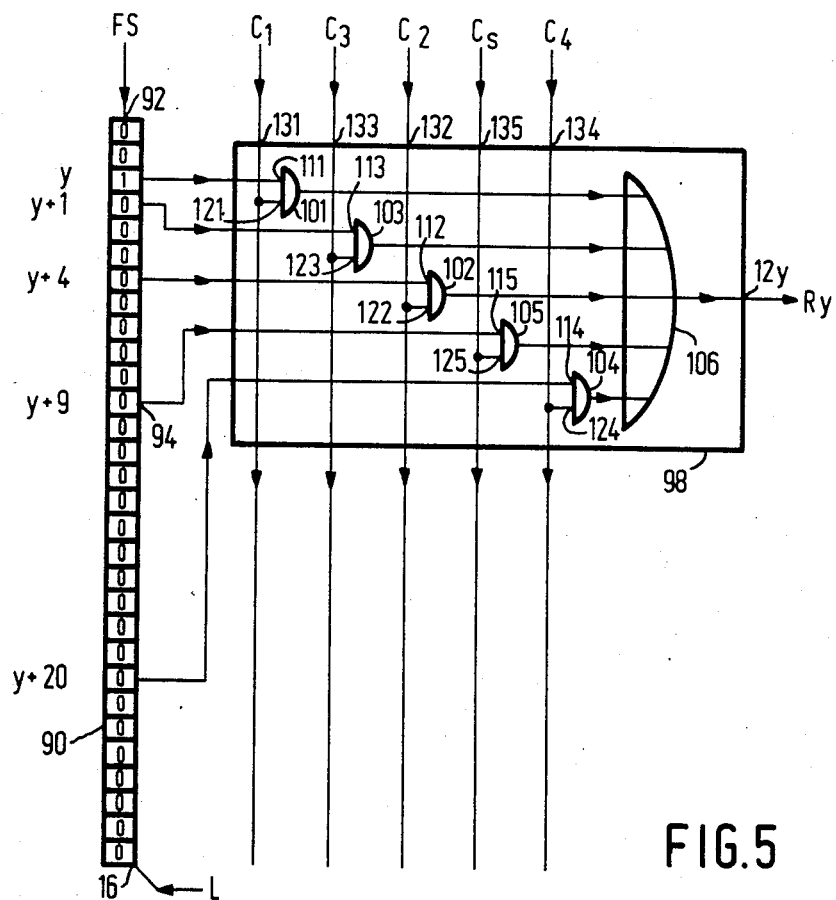
FIG. 5 shows a wiring diagram of a possible realisation of the Y-selection.

FIG. 5 shows a simple circuit for the Y-selection 11 comprising an N-bit selection shift register 90 having an input 92 and N bit-outputs 94. The selection shift registers 90 shift at the end of each T using the negative back slope of L (or $C_s$) at the selection shift input 16.

The Y-selection further comprises r selection gate circuits 98, one for each row, of which only one is shown for row $R_y$. The output of the selection gate circuit 98 constitutes the output $12_y$ of the Y-selection 11. Each selection gate circuit 98 comprises (m+1) AND-gates 101-105 and an OR-gate 106.

Once every frame a frame synchronisation signal FS sets the input 92 to "1", e.g. at a timing $L \cdot T_0$ which is shifted into the first flip-flop of the selection shift register 90 at the negative back slope of L. At each further shift signal this 1 shifts to the next flip-flop. FS then being "0" all other flip-flops of the selection shift register contain zeroes.

For the selection gate circuit $98_y$ for row $R_y$ first inputs 111-115 of the AND-gates 101-105 are connected to the bit outputs $94_y$, $94_{y+4}$, $94_{y+1}$, $94_{y+20}$ and $94_{y+9}$ respectively and second inputs 121-125 are connected to inputs 131-135 for the timing signals $C_i$ common to all selection gate circuits 98. Outputs of the AND-gates 101-105 are connected to corresponding inputs of the OR-gate 106 with output $12_y$. It will be evident, that $R_y=1$ during $C_1$ of $T_y$, $C_3$ of $T_{6+1}$ etc., exactly as required in the description of FIG. 2.

At first sight it seems that a selection shift register 90 of $N+20=50$ bits would be required for the higher values of y.

Due to the fact that a new "1" is fed to the shift register every N periods T, this would mean that in such cases e.g. bit y+20 would have a "1" simultaneously with a "1" in $y+20-N=y-10$ so that bit-output $94_{y-10}$ can be used equally well. If all values (y+z) are counted modulo-N in this way, a selection shift register 90 having N bits may be used as shown in FIG. 5.

In this case the signal $C_4$ is also required. In relation to the timing circuit according to FIG. 4 the timing signal $C_i$ can be defined by the Boolean equations.

$$C_1 = B'_0 \cdot B'_1 \cdot B' \cdot L'$$

$$C_2 = B_0 \cdot B'_1$$

$$C_3 = B'_0 \cdot B_1$$
$$C_4 = B_0 \cdot B_1$$
$$C_s = B + L (= C_5)$$

Figure 6A:
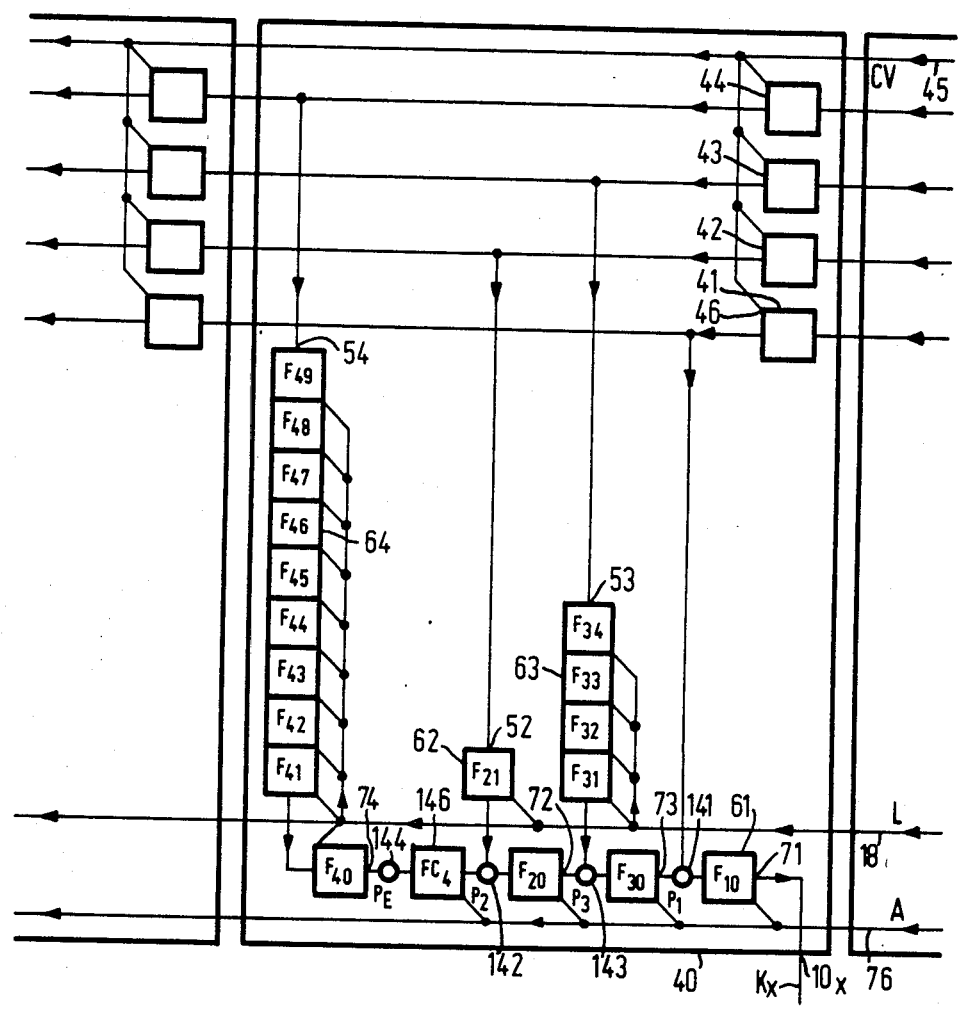
FIGS. 6A, B and C show the wiring diagrams of other realisations comparable to that of FIG. 2.

FIGS. 6A, B and C show different implementations of the sequencing means. Each of the figures shows a column circuit 40 with an output $10_x$ for a signal $K_x$ identical to that generated by the circuit according to FIG. 2.

These examples have in common, that the output flip-flops of the column shift registers 61-64 are interconnected such that they are also part of a horizontal column shift register that is shifted, from left to right in the figures, at the end of each sub-period $C_i$, using a horizontal shift signal A from a common horizontal shift input 76. The signal A is shown in FIG. 3 and is obtained from the output 76 of the divide by n/s counter 80 of FIG. 4. One of the s negative back slopes of the signal A coincides with the negative back slopes of L and $C_s$.

In FIG. 6A the interconnection is realised by insertion of m=4 gating circuits 141-144 providing logical output signals $P_1$, $P_2$, $P_3$ and $P_4$ respectively. The information output $10_x$ is in this case identical with the output $71_x$ of flip-flop 61 ($F_{10}$).

The gating circuit 141 provides an input signal $P_1$ for $F_{10}$ according to the Boolean equation $$P_1 = L \cdot V_{1,x} + L' \cdot F_{30}$$

At the end of a period $T_{y-1}$ the least significant video bit will be written into $F_{10}$ due to the fact that $L="1"$ and $L'="0"$, just as was the case in the column circuit 40 according to FIG. 4. At the end of $C_1$ however $L="0"$ and $L'="1"$ so that $F_{10}$ will take over the content of $F_{30}$. If $F_{10}$ is a JK-flip-flop this result is obtained if $J_{10}=P_1$ and $K_{10}=P'_1$ or if $J_{10}=\bar{K}_{10}=P_1$.

$K_x$ will be equal to the least significant bit during $C_1$ of $T_y$. Using $$P_3 = L \cdot F_{31} + L' \cdot F_{20}$$

$K_x$ will be equal to the one but least significant bit row $R_{y-4}$ during $C_2$ of $T_y$, that of $R_{y-3}$ during $C_2$ of $T_{y+1}$ and so on up to the least significant bit of $R_y$ during $C_2$ of $T_{y+4}$ as required.

Similarly:

$$P_2 = L \cdot F_{21} + L' \cdot FC_4$$

in which $FC_4$ is an extra flip-flop 146 inserted to ensure that $K_x="0"$ during all sub-periods $C_4$. Therefore $P_4 = L' \cdot F_{40}$.

Figure 7:
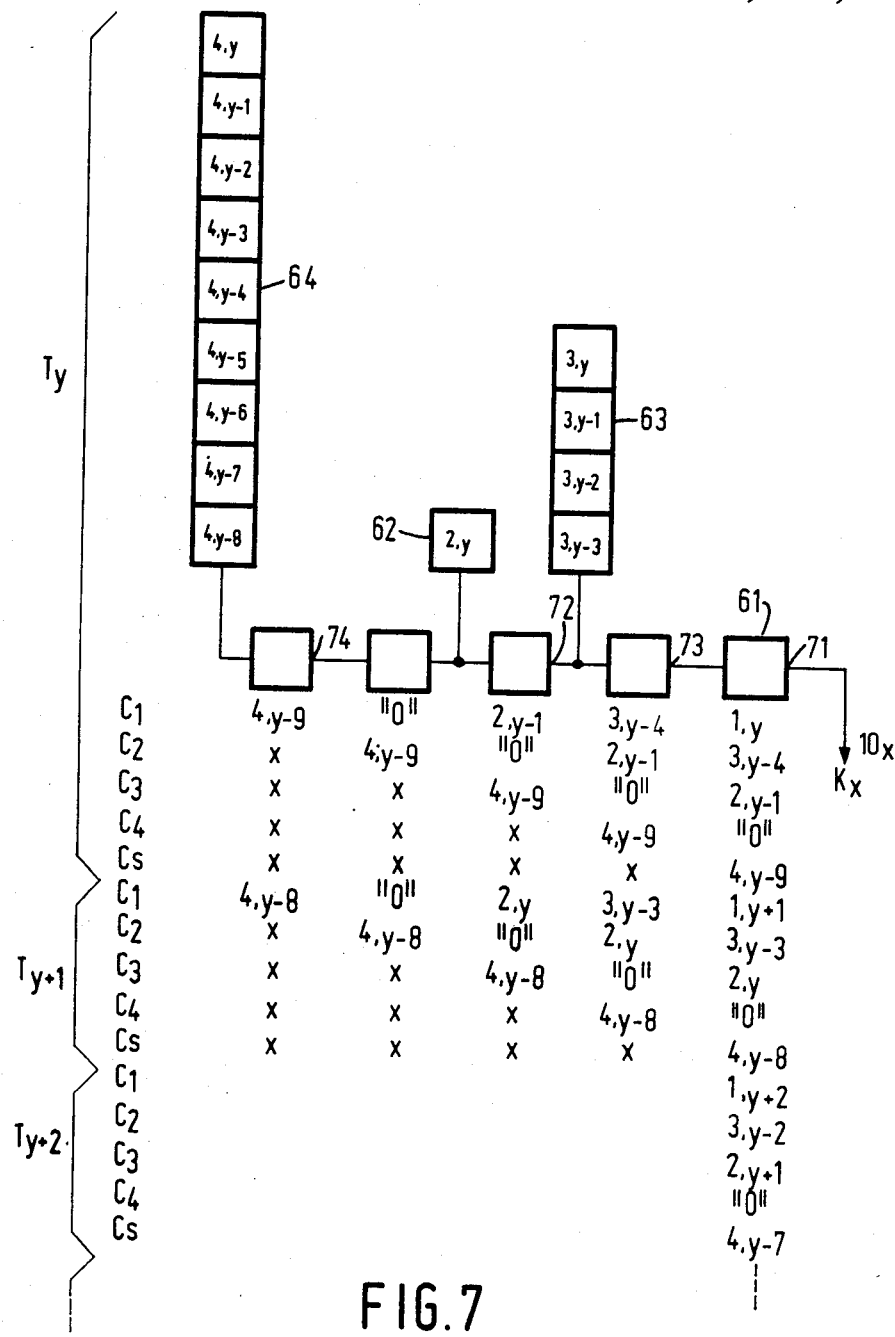
FIG. 7 shows the successive flip-flop contents in the shift registers of realisations according to FIGS. 6A, B and C.

The detailed subsequent contents of all flip-flops are shown in FIG. 7, showing that at the end of $T_{y-1}$ the flip-flop $F_{49}$ contains bit 4 for the display element x, y, $F_{34}$ contains bit 3, $F_{21}$ bit 2 and $F_{10}$ bit 1 for the same display element x, y, etc.

On $K_x$ bit 1,y is present during $C_1$ of $T_y$ etc. All x's denote that the content of the output flip-flop of a column shift register is immaterial. This content will be replaced at the end of $T_y$ and will never reach $K_x$. As shown in FIG. 6A x will equal 4,y−9 during $T_y$, 4,y−8 during $T_{y+1}$ and so on. But it is equally possible to shift either zeroes or ones into $F_{40}$. If zeroes are shifted into $F_{40}$ after $C_1$ then the gating circuit $P_E$ will be superfluous, because in that case $FC_4$ always contain a zero at the end of every video line time T. Many other variations can be introduced by the normally skilled logical designer, such as shifting $F_{40}$ on A instead of L. The column circuit 40 of FIG. 6A has the advantage that the decoded signals $C_i$ are no longer required in the video memory which is easier if several column circuits 40 have to be combined into one large scale integrated circuit.

It should be remarked that the last shift due to A comes half a clock period early. This is immaterial due to the fact that in reality there are a few hundred up to one thousand or more clock periods per video line time T. The effect can be avoided by using e.g. $(A \cdot B' + L')$ instead of A for the horizontal shift command signal.

Figure 6B:
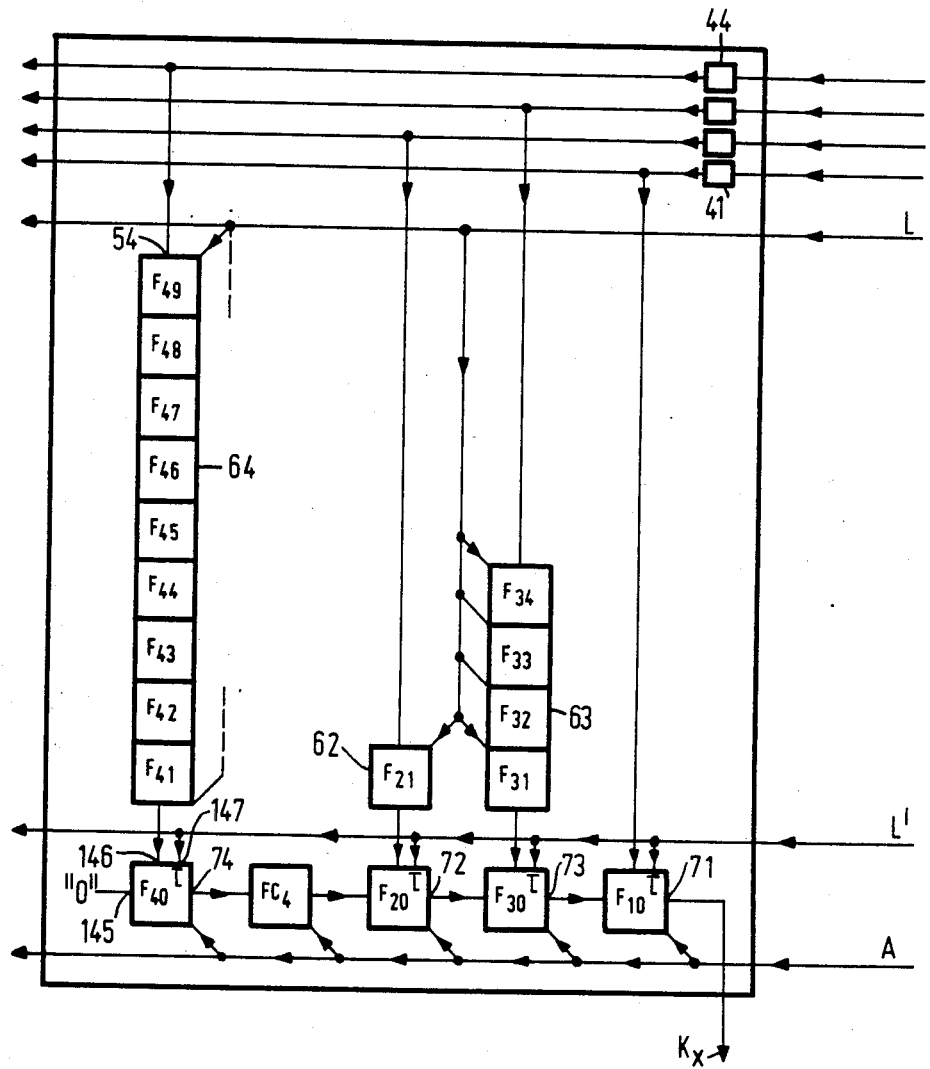

FIG. 6B shows an implementation of the sequencing means in which the output flip-flops of the column shift registers take over the contents of their preceding flip-flops on $L = 1$ ($L' = 0$). Each of the output flip-flop has a shift input 145, a load input 146 and a load enable input 147 ($L'$).

In this example the flip-flops of the horizontal shift register are loaded at the end of each $T_{y-1}$ by $L'$. $F_{10}$ is leaded with $V_{1,x}$, $F_{30}$ with the contents of $F_{31}$ just before the contents of $F_{32}$ are shifted into $F_{31}$ and so on. The horizontal shift register again shifts on A. In this example the first input 145 receives always a zero, e.g. by connecting 145 to ground, so that in FIG. 7 the value x will be zero, thus ensuring that the content of the flip-flop $FC_4$ will always be zero at the beginning of a cycle. In all other aspects the operation is the same as in the example according to FIG. 6A, using the timing of FIG. 3, in which the signal $L'$ is the inverse signal of L.

Instead of a load input it is possible to use set (S) and reset (R) inputs for the individual flip-flops of the horizontal shift register, according to the Boolean equations for e.g. $F_{40}$:

$$S_{40} = L \cdot F_{41} = (L' + F_{41})'$$

$$R_{40} = L \cdot F_{41} = (L' + F_{41})'$$

Figure 6C:
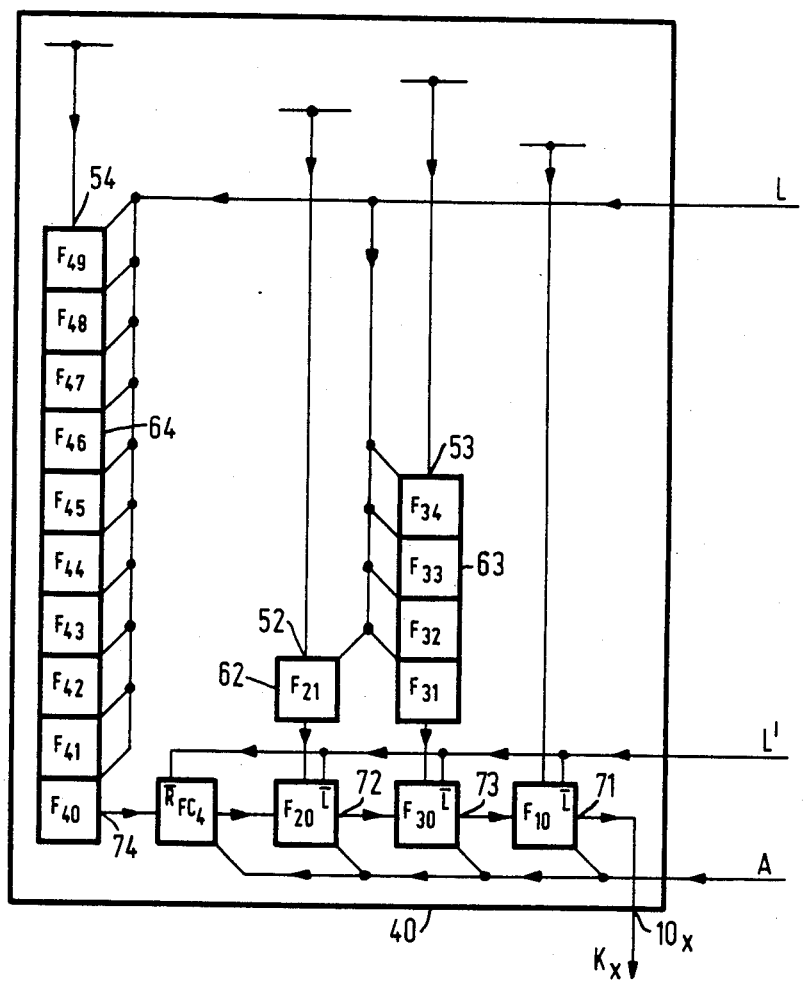

FIG. 6C shows still another implementation of the sequencing means, which is a mixture of the possibilities already discussed. The function is therefore self-evident from FIG. 6C. The flip-flop contents are again those of FIG. 7, x being equal to 4, y−9 etc.

The column circuits 40 according to FIGS. 6A, 6B, 6C or similar have the advantage that there is no necessity to supply all signals $C_i$ to the video memory. It is sufficient to supply CV, L or $L'$ and A. A further reduction is possible if only CV and $L'$ are supplied, and using extra k/s dividers to derive A from CV.

An integrated circuit comprising a number of column circuits 40 and one divider 80 (FIG. 4), will require m inputs for the video signal, m outputs for the video signal and 4 pins for supply voltage, ground, CV and $L'$. In the case of m = 7 thus 18 pins are required for these purposes. If 40-pin large scale integrated circuits are used there are left 22 pins for signals $k_x$ so that 22 column circuits 40 can be incorporated in one LSI.

Figures 8, 9:
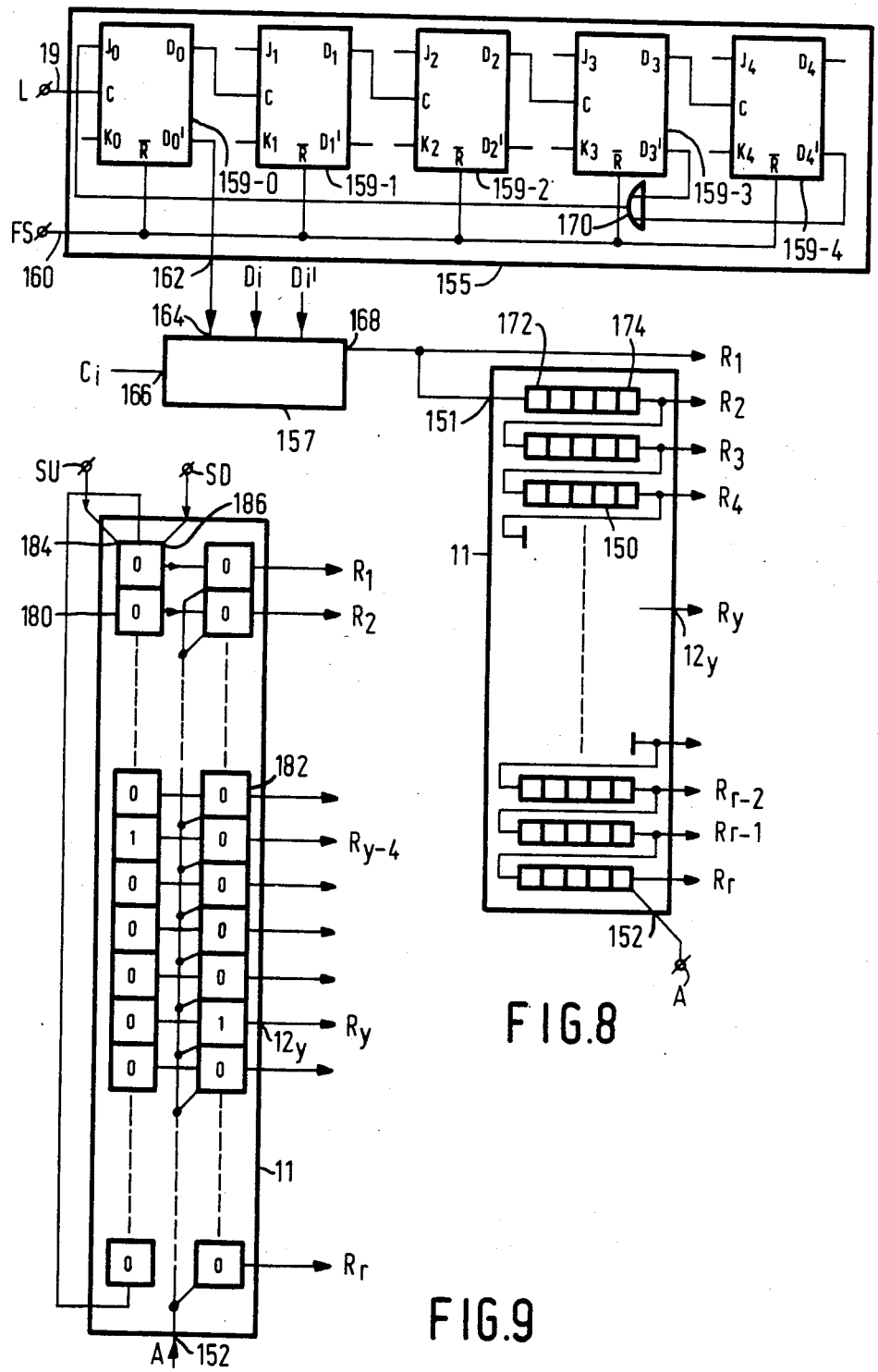
FIGS. 8, 9 show further realisations for the Y-selection, especially designed for easy integration.

Similar reductions are possible for the Y-selection 11, two examples are shown in FIGS. 8 and 9. These examples solve a further problem connected with the Y-selection according to FIG. 5. Although the required number of components per row is small, the interconnections between the selection shift register 90 and the gating circuits 98 are very large in number. In total $(m+1) \cdot r$ of such connections are needed resulting in a complicated interconnection pattern that is difficult to integrate.

In FIG. 8 the Y-selection 11 consists of a single shift register 150 having $(r-1) \cdot s$ bits, the shift register further having an input 151 for a timing signal, a selection shift command input 152 for a selection shift command signal A and (r−1) outputs $12_y$ for the rows $R_2$–$R_r$. Needing four pins for inputs 151, 152, power supply and ground, a 40 pin package can contain 36s bits with 36 output pins $12_y$. Such LSI-circuits can be connected in series by using the output for $R_{37}$ as input on input 151 of the next LSI-circuit.

A slight modification of FIG. 1 is correspondingly required. The timing circuit 13 now supplies signals $R_1$ and A to the Y-selection 11.

The signal $R_1$ is the timing signal as required for row $R_1$ and is also connected to the input 3 of the display 1 for the first row. Due to the fact, that each 5-th flip-flop output of the selection shift register 150 constitutes one of the outputs $12_y$ for $R_y$ it will be clear that all these outputs receive the same signal pattern as $R_1$ but delayed over (y−1) video line time periods T, that is always after (y−1)·s sub-periods $C_i$.

To generate the signal $R_1$ the timing-circuit further comprises a video line time counter 155 and a decoder 157.

The counter 155 is in this example a simple divide by 32 circuit consisting of five successive dividing flip-flops 159−a (a = 0, 1, 2, 3, 4) and has an input 19 for a counting input signal L, a reset input 160 for a reset signal FS and several outputs 162 for the flip-flop outputs $D_a$. The outputs 162 of the counter 155 are connected to corresponding inputs 164 of the decoder 157, which has further inputs 166 for signals $C_i$ as derived from the divide by s circuit 82 from FIG. 4 and an output 168 for the signal $R_1$.

The counter 155 further comprises an OR-gate 170 of which the two inputs are connected to the outputs $D'_3$ and $D'_4$ of flip-flops 159-3 respectively 159-4, its output being connected to $J_o$ of flip-flop 159-0, all other $J_a$ and $K_a$ being "1".

The reset signal FS is supplied once every frame somewhere during the period $T_0$, either by data processing equipment or by a television receiver as derived from its frame synchronisation signal, bringing the counter in the position $D_0 = $ "0", $D_1 = $ "0" etc., short 00000. At the end of $T_0$ the first pulse L brings the counter in the binary position 00001 (most significant bit first) and increases its value once every video line time. Its content will be equal to y during every $T_y$ up to $y = 11000 = 24$. At that moment $J_o$ becomes "0" and the counting stops until it is reset at the beginning of the next frame.

The counter settings y=1, y=2, y=5, y=10 and y=20 are decoded in the decoder 157, combined in such a way with the signals $C_i$, that $$R_1 = T_1 \cdot C_1 + T_2 \cdot C_3 + T_5 \cdot C_2 + T_{10} \cdot C_5 + T_{21} \cdot C_4$$

as required in the description of FIGS. 2, 6A, 6B and 6C. The complete Boolean equation describing the decoder becomes $$R_1 = D'_4 \cdot D'_3 \cdot D'_2 \cdot D'_1 \cdot D_0 \cdot C_1 + D'_4 \cdot D'_3 \cdot D'_2 \cdot D_1 \cdot D'_0 \cdot C_3 \\ + D'_4 \cdot D'_3 \cdot D_2 \cdot D'_1 \cdot D_0 \cdot C_2 + D_3 \cdot D'_2 \cdot D_1 \cdot D'_0 \cdot D'_0 \cdot C_5 + \\ D_4 \cdot D'_3 \cdot D_2 \cdot D'_1 \cdot D'_0 \cdot C_4$$

and $R_1$ is the correct output for row $R_1$ of the display 1. The output 168 of the decoder 157 is further connected to the input 151 of the Y-selection 11. This input 151 is "1" during $C_1$ of $T_1$ and will be shifted into the first flip-flop 172 of the selection shiftregister 150 at the end of $C_1$ due to the shift command signal A at its input 152. After s=5 shifts the fifth flip-flop 174 will contain this "1", so that $R_2 = $ "1" during $C_1$ of $T_2 \cdot R_1 = $ "0" in the mean time, so that the other flip-flops of 150 will be "0".

Seven sub-periods later $R_1$="1" again, which causes $R_2=1$ again s=5 sub-periods later than that, i.e. during $C_3$ of $T_3$, etc. In the same way $R_y$="1" during $C_1$ of $T_y$, $C_3$ of $T_{y+1}$, $C_2$ of $T_{y+4}$, $C_5$ of $T_{y+9}$ and $C_4$ of $T_{y+20}$.

Although the selection shift register 150 requires s elements per row, the simple wiring, the absence of set or reset inputs and the need for only one signal input 151 make this type of Y-selection eminently suitable for large scale integration and thereby cheap. The counting frequency, although s times higher than the frequency required according to FIG. 5, will be still relatively low. Even with s=11 the required frequency s/T will be for normal European television applications in which T=64 microseconds, equal to $$(11/64.10^{-6}) = 172 \text{ kHz}.$$

which can easily be used even when using a relatively slow MOS-technology.

The sequence in which the different row outputs are energized can be reformulated as follows:

$R_y$ is energized during $C_1$ of $T_y$, $C_2$ of $T_{y+4}$, $C_3$ of $T_{y+1}$, $C_4$ of $T_{y+20}$ and $C_5$ of $T_{y+9}$. Conversely this means, that e.g. $R_{y-4}$ has to be energized during $C_2$ of $T_{y-4+4} = T_y$.

Therefore $R_y$="1" during $C_1$ of $T_y$, $R_{y-4}$="1" during $C_2$ of $T_y$, $R_{y-1}$="1" during $C_3$ of $T_y$, $R_{y-20}$="1" during $C_4$ of $T_y$ and $R_{y-9}$="1" during $C_5$ of $T_y$. In the next video line time $R_{y+1}$="1" during $C_1$ of $T_{y+1}$ etc.

This sequence can be obtained also by an Y-selection 11 according to FIG. 9 in the case of r=n. The Y-selection 11 now comprises a Shift Up/Shift Down Register 180 having n=r flip-flops, each coupled to one corresponding latch flip-flop 182. The r outputs of these latches 182 constitute the r selection outputs $12_y$ for the rows $R_y$. The SUSDR 180 has a shift-up input 184 for a shift-up command signal SU and a shiftdown input 186 for a shift-down command signal SD. The signals SU and SD can be supplied by a data processing unit or by a pre-programmed counter in the timing circuit 13. The required preprogrammed counter is not shown in the drawings but can be easily designed by a normally skilled logic designer.

What is claimed is:

1. Matrix control circuit for a memory-type visual display with k column inputs and r row inputs for k times r display elements comprising:

an m-bit serial digital video input receiving a signal defining sequentially one out of $2^m$ brightness levels for each display element of a row y (y=1, 2, .., r) of display elements during successive video line times $T_{y-1}$ within a frametime that is at least equal to r times a video line time;

a series-parallel converter connected to the digital video input, having k times m column outputs corresponding to m bits for each column;

a video memory for storing column brightness information, having k times m information inputs which are coupled to the corresponding outputs of the series-parallel converter and k information outputs connected to the k corresponding column inputs of the display;

a Y-selection circuit having r selection outputs connected to the corresponding r row inputs of the display, the Y-selection circuit providing (M+1) selection pulses to each row of the display for setting or resetting the memory-type display elements of that row;

a timing circuit having at least one clock signal output for supplying a clock signal to clock signal inputs of the video memory and of the Y-selection circuit and a reset signal output for supplying a reset signal to reset signal inputs of the video memory and of the Y-selection circuit;

said video memory comprising a number of k column memories, each having a number of m column shift registers of respectively $b_j$ bits (j=1, 2, ..., m), each column shift register having an input that is coupled to the corresponding information input for the corresponding column, a column shift register output and a line time shift signal input for a line time shift signal shifting all column shift registers substantially at the end of each video line time $T_{y-1}$, each column memory further having sequencing means that couple the information shifted into output bits of the column shift registers at the end of a video line time $T_{y-1}$, to the information output of the corresponding column, for each output bit during a different part $C_i$ of the video line time $T_y$, i being one of the numbers 1 through s inclusive with s being a number that is at least equal to m.

2. Matrix control circuit according to claim 1, wherein the sequencing means comprise m AND-gates each having a first input, a second input and an output and an OR-gate having m inputs and an output, wherein each first input is connected to receive an corresponding output bit, each second input is connected to a different timing signal input corresponding to a part $C_i$ of the video line times T, each output of the AND-gates being connected to the corresponding input of the OR-gate, the output of the OR-gate being coupled to the information output corresponding to the column memory.

3. Matrix control circuit according to claim 1, wherein the sequencing means interconnect the output bits of the column shift registers of one column memory such that they form m bits of a p-bit shift register, p being a number at least equal to m and not larger than s, said p-bit shift register having a further shift signal input for a further shift signal that shifts the contents of the p-bit shift register at least (p−1) times, at the end of each of the first (p−1) parts $C_i$ of a video line time T, the output of the p-bit shift register being coupled to the information output corresponding to the column memory.

4. Matrix control circuit according to claim 1, wherein the Y-selection circuit comprises a video line time counter having a number of counting positions corresponding to the maximum number of successive video line times that correspond to the maximum required storage time for the memory-type display elements, a decoder and a selection shift register having (r−1) times a bit, wherein bit-outputs of the video line time counter are coupled to corresponding decoder inputs of the decoder, the decoder further having timing inputs for timing signals corresponding to the parts $C_i$ of the video line times T and a decoder output which is coupled to an input of the selection shift register and to the Y-selection output for the first row to supply selection signals to said row during the periods in which the m information bits for the display elements of the first row $R_1$ are represented at the information outputs of the column memories and wherein each s-th bit of the selection shift register is coupled to one of the further Y-selection outputs for the further rows $R_2$ up to $R_r$ inclusive, the selection shift register having a shift input for a Y-shift signal for shifting the information contained in the selection shift register substantially at the end of each period $C_j$.

5. Matrix control circuit according to claim 1, wherein the Y-selection circuit comprises an r-bit up-down shift register in which shift register always single contains a "1" that is shifted up or down at least over one bit position during each period $C_i$ according to shift pulses from a pre-programmed up-down counter supplied to a shift-up input or to a shift-down input of the up-down shift register, each bit output of said up-down shift register being coupled to one output of r corresponding selection latches having a common latch-load input for loading the latches with the contents of the up-down shift register substantially at the end of each period $C_j$.

* * * * *

UNITED STATES PATENT AND TRADEMARK OFFICE
CERTIFICATE OF CORRECTION

PATENT NO. : 4,672,357
DATED : June 9, 1987
INVENTOR(S) : Jean H. J. Lorteije; et al It is certified that error appears in the above-identified patent and that said Letters Patent is hereby corrected as shown below:

IN THE CLAIMS

Claim 4, line 8    change "a bit," to --s bits,--

Claim 5, line 3    after "always" insert --contains a--

Claim 5, line 4    delete "contains a";

Signed and Sealed this

Twenty-ninth Day of November, 1988

Attest:

DONALD J. QUIGG

Attesting Officer    Commissioner of Patents and Trademarks